United States Patent
Böhm et al.

[11] Patent Number: 6,000,507
[45] Date of Patent: Dec. 14, 1999

[54] CONTROL OR ADJUSTMENT SYSTEM FOR A WHEEL BRAKE OPERATED BY AN ELECTRIC MOTOR

[75] Inventors: Jürgen Böhm, Oberneisen; Karl-Heinz Bill, Dreieich, both of Germany

[73] Assignee: ITT Manufacturing Enterprises Inc., Wilmington, Del.

[21] Appl. No.: 09/043,088

[22] PCT Filed: Aug. 6, 1996

[86] PCT No.: PCT/EP96/03475

§ 371 Date: May 1, 1998

§ 102(e) Date: May 1, 1998

[87] PCT Pub. No.: WO97/12793

PCT Pub. Date: Apr. 10, 1997

[30] Foreign Application Priority Data

Sep. 30, 1995 [DE] Germany .............. 195 36 694

[51] Int. Cl.⁶ .................................................. B60T 13/74
[52] U.S. Cl. .................... 188/158; 188/1.11 E; 188/71.8; 188/72.1; 188/162; 188/181 T; 303/20
[58] Field of Search .................. 303/3, 115.2, 162, 303/113.4, 112, 155, 20; 188/181 T, 72.1, 156, 158, 162, 161, 1.11 E, 71.8, 71.9, 196 BA, 196 R, 196 B, 71.1, 72.8, 163; 701/70

[56] References Cited

U.S. PATENT DOCUMENTS

| | | | |
|---|---|---|---|
| 3,790,225 | 2/1974 | Wehde | 188/162 |
| 4,327,414 | 4/1982 | Klein | 188/162 |
| 4,865,162 | 9/1989 | Morris et al. | 188/158 |
| 4,986,614 | 1/1991 | Ricker et al. | 303/115.2 |
| 4,997,237 | 3/1991 | Ricker et al. | 303/115.2 |
| 5,219,216 | 6/1993 | Savage et al. | 303/115.2 |
| 5,264,767 | 11/1993 | Chin et al. | 303/115.2 |
| 5,320,421 | 6/1994 | Kade et al. | 303/115.2 |
| 5,333,706 | 8/1994 | Mori | 188/161 |
| 5,366,280 | 11/1994 | Littlejohn | 188/162 |
| 5,385,394 | 1/1995 | Leppek et al. | 303/115.2 |
| 5,558,409 | 9/1996 | Walenty et al. | 303/113.4 |
| 5,611,606 | 3/1997 | Nell et al. | 303/115.2 |
| 5,829,557 | 11/1998 | Wimmer et al. | 188/72.1 |

*Primary Examiner*—Douglas C. Butler
*Attorney, Agent, or Firm*—Rader, Fishman & Grauer PLLC

[57] ABSTRACT

A control or adjustment system for a disc brake is operated by an electric motor causing the friction linings of the disc brake in application to the brake disc. To transmit an application force as sensitively as possible to cause deceleration of the vehicle as desired by the driver, on the one hand, and to adjust a precise clearance after a braking operation, on the other hand, two different control modes are applied. The electric motor, therefore, is driven by an electronic servo booster that is actuated either by a deceleration controller or by a position controller, depending on the objective to be achieved.

10 Claims, 3 Drawing Sheets

CONTROL OR ADJUSTMENT SYSTEM FOR A WHEEL BRAKE OPERATED BY AN ELECTRIC MOTOR

BACKGROUND OF THE INVENTION

The present invention relates to a control or adjustment system for a wheel brake operated by an electric motor.

A system of this type is described, for example, in U.S. Pat. No. 4,995,483. The brake concerned is an aircraft brake.

An application force of the wheel brake is determined to satisfy the demand for deceleration of the operator of an aircraft or a vehicle. A servo motor is actuated until a determined adjustment travel of the actuating member is reached, the measurement starting with the first contact of the brake lining with the brake disc.

This provision is not sufficient to sensitively slow down the vehicle. Admittedly, there is a basic relationship between the displacement travel of the adjusting element and the application force. However, the application force may vary due to external influences and, in addition, the brake torque to be achieved is not absolutely linked to the application force.

After it has been fixed that the brake lining is declamped from the brake disc upon release of the brake, the motor is still energized for a certain period of time so that the brake linings are further removed from the brake disc. The clearance which is caused by this action is not defined precisely because the clearance is not specifically linked with the energization time of the motor.

Therefore, the object of the present invention is to provide an improved system of sensitive braking and reliable adjustment of an accurately defined clearance.

SUMMARY OF THE INVENTION

To achieve this objective, the present invention discloses the provision of a first control circuit that adapts the actual displacement travel of the actuating element to the desired value. In addition, a value that characterizes the braking effect is adapted correspondingly to a nominal standard in a second control circuit.

The brake application is now effected by way of the second control circuit, and the clearance is adjusted by way of the first control circuit.

A switch is provided that activates either the first or the second control circuit.

The type of control permits initially adjusting a small clearance when the brake is released and adjusting the full clearance after a certain time only. Repeated brake application immediately after release of the brake will then occur rapidly because no clearance must be overcome.

The present invention will be explained in detail hereinbelow by way of the embodiments of three Figures.

DETAILED DESCRIPTION OF A PREFERRED EMBODIMENT

Figure 1:
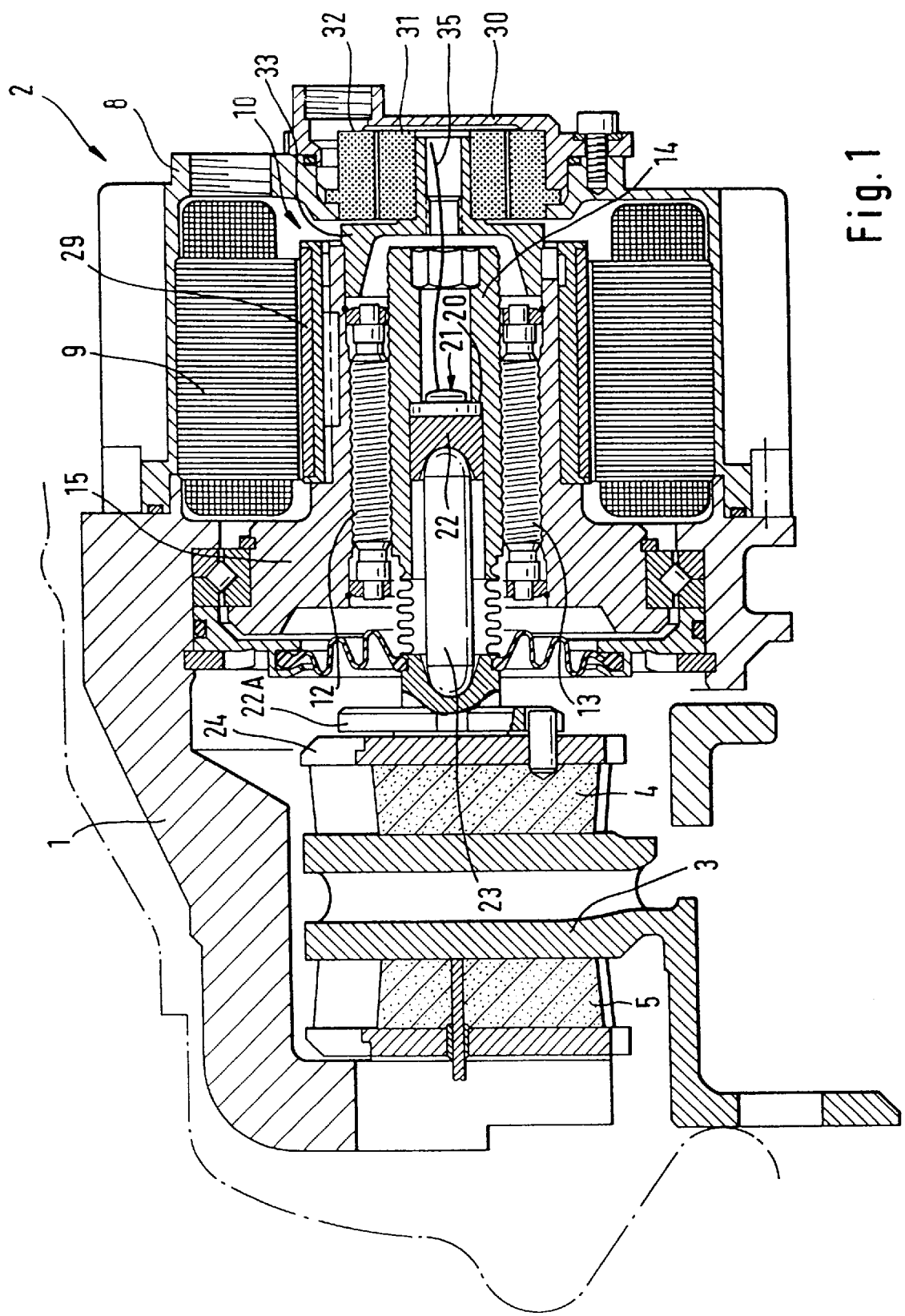
FIG. 1 shows an electromechanically operable floating-caliper disc brake.

FIG. 1 shows an electromechanically operable floating-caliper disc brake. Of course, the actuation of the brake that will be described hereinbelow may also be transferred to all other types of disc brakes and drum brakes.

The floating-caliper disc brake includes a brake caliper 1 that is slidably mounted with respect to the brake disc 3, and an electric motor 2 having its housing 8 attached to the brake caliper 1. One friction lining 4, 5 is arranged on either side of the brake disc. The first friction lining 4 is supported on a spindle 14 that is driven by the electric motor 2, with the result that the lining can be pressed against the brake disc 3 by the electric motor 2. The second brake lining 5 is attached to the brake caliper 1 and is pressed against the other side of the brake disc by reaction forces that are transmitted to the caliper 1 when the first lining 4 is applied to brake disc 3. The electric motor 2 is a permanently energized, electronically commutatable motor having a stator 9 rigidly mounted in the housing 8. The stator 9 is configured as a coil system in a known fashion. Rotor 10 includes a hollow shaft 15 that is rotatable in the brake caliper 1. Several permanent magnetic segments 29 are arranged on the outside of the hollow shaft and rigidly connected with the hollow shaft 15. The magnetic field produced by the stator 9 interacts with the permanent magnetic field of the magnetic segments 29 and causes rotation of the hollow shaft 15. The rotation is transferred into an axial movement of the spindle 14 by a roller screw drive. To this end, the inside of the hollow shaft 15 and the outside of the spindle 14 each include a thread engaging into the thread of paraxial thread rollers 12, 13.

The spindle 14 is configured as a hollow cylinder with an inward step 20. Bearing against step 20 is a force sensor 21 and a spherical cup 22 on that a push rod 23 abuts. Rod 23, in turn, is supported with its other end on another spherical cup 22A that is anti-torsionally connected to a lining carrier 24 of the first friction lining 4.

Further, the motor 2 includes a so-called resolver 30. Resolver 30 has two rings 31, 32 that are coaxial to each other and separated by an air slot. The radially inward ring 31 is connected to the hollow shaft 15 by a retaining element 33. The radially outward ring 32 is connected to the housing 8. The signals of the resolver are used, on the one hand, to commutate the motor, i.e., to perform the energization of the stator 9 so that a traveling magnetic field is generated and, on the other hand, to determine the relative angle position of the rotor. Because the angle position of the rotor is directly linked to the axial position of the spindle, the signal of the resolver is also an indicator of the position of the spindle 14 in the brake caliper 1.

The supply line 35 to the force sensor 21 extends through the hollow spindle 14 and through a central aperture in the retaining element 33 for the resolver 30. The brake described hereinabove is actuated by energization of the electric motor 2.

The brake must perform the following functions:

1. Apply the brakes

This means that the friction linings 4, 5 are pressed against the brake disc 3 with a defined force, the application force, so that the friction forces generated produce a brake torque that causes deceleration of the vehicle wheel connected to the brake disc 3.

2. Release the brakes

This means that the application force is decreased and, thus, adapted to the vehicle deceleration desired by the driver.

3. Adjust the clearance

This means that the electric motor 2, after braking, must be actuated so that the brake linings 3, 4 keep a distance from the brake disc. This distance is termed as 'clearance'. The purpose of maintaining a clearance of this type is to prevent the friction linings from rubbing against the brake disc when a braking effect is not intended.

To fulfill these objectives, control of the motor current is necessary. The control can be based on two different principles, i.e., on position control, or deceleration control.

In position control, the electric motor 2 is actuated so that the spindle 14 is shifted by a defined rate.

In deceleration control, a defined desired deceleration signal that characterizes the braking effect is adjusted.

The desired deceleration signal may be the application force, the brake torque produced by the application force, or the (rotational) deceleration of the vehicle wheel caused by the brake torque.

Both controllers are integrated in an actuating electronics for the electric motor 2 and are connected in parallel to each other. Either the deceleration controller or the position controller is activated by a selection circuit.

Figure 2:
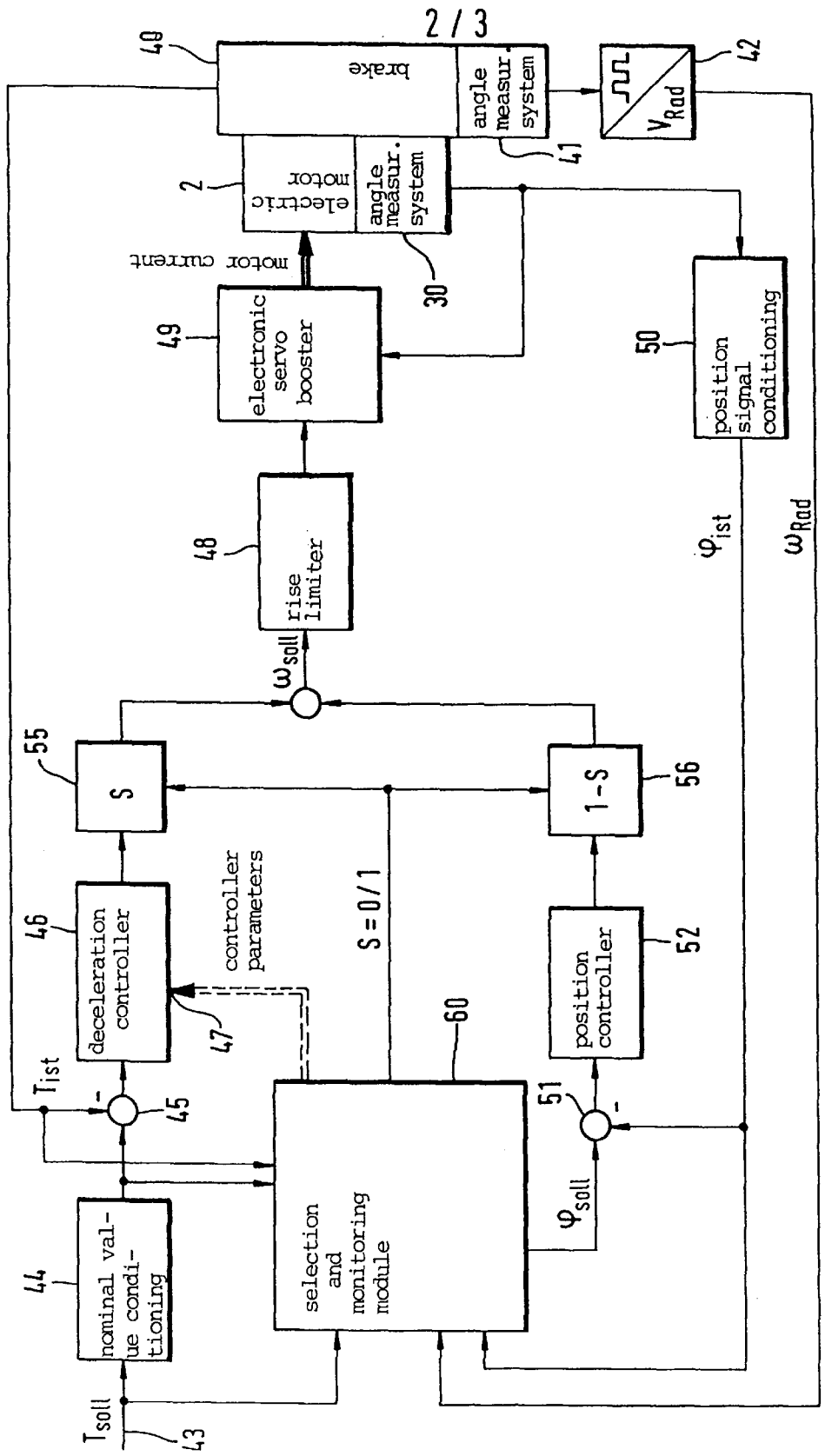
FIG. 2 shows a basic electronic circuit for a brake according to the invention.

The basic circuit is shown in FIG. 2. The brake 40 and the associated electric motor 2 are represented on the right hand side in the drawing. The illustrations show a design of the brake operated by an electric motor according to the FIG. 1 embodiment. Associated with the electric motor 2, as has already been explained, is a resolver 30 that furnishes signals about the position angle of the rotor 10 and, thus, of the brake linings in relation to the brake disc 3. Allocated to the wheel associated with the brake 40 is an angle measurement system 41. The time derivatives of the signals provided by the angle measurement system 41 supply data about the angular velocity $\omega_{rad}$ of the wheel being braked. The signal of the angle measurement system 41 is differentiated in the differentiator 42.

A nominal signal $T_{soll}$ sent as a desired deceleration signal by a superior unit is applied to the input 43 of the electronic evaluating unit. Most simply, the value $T_{soll}$ at the input 43 represents the driver's desire to decelerate the vehicle to a certain degree. The value is sent to a desired value conditioner 44 that modifies the value $T_{ist}$ so that, in consideration of the available dynamics, the brake 40 is actuated as optimally as possible in terms of time and that no oversteerings are induced in the subsequent controller. The modulated nominal value is compared with an actual value $T_{ist}$ in a comparator 45. For example, the value may have been determined by the force sensor 21. Thus, the value $T_{ist}$ is a magnitude that indicates insofar as the driver's wish is satisfied in the brake 40. The difference between the nominal signal and the actual signal determined in the comparator 45 is conducted to a deceleration controller 46. Controller 46 calculates a nominal angle speed of the motor and, thus a nominal feed rate for the spindle 14. (The angular velocity of the rotor and the nominal feed rate of the spindle are linked to each other in terms of the dimensioning of the roller screw drive.) Most simply, the deceleration controller operates proportionally, i.e., the result of the comparator 45 is linearly converted into a nominal angular velocity of the motor. As a parameter, the rigidity of the brake system is mainly taken into account in this calculation. The term 'rigidity' implies the following. When the application forces applied to the brake disc 3 are increased, the result is that the brake caliper 1 is expanded and the friction linings are compressed by the action of the reaction forces. The result is that the electric motor 2 moves away from the brake disc 3, that the spindle 14 in relation to the motor, corresponding to the expansion of the caliper, must be moved towards the brake disc in order to keep the first brake lining 4 in contact with the brake disc 3. The higher the application force becomes, the more increases the expansion of the brake caliper 1. Thus, there is a relationship between the additional displacement travel of the spindle 14 and the application force. The term 'rigidity' describes the ratio between the expansion of the caliper 1 and the application force exerted. The rigidity of the brake system mainly results from the rigidity of the caliper and the friction linings.

With a high degree of rigidity of the caliper, even small angle variations of the motor permit a quick adjustment of the actual value to the preset nominal value. This must be taken into account in the deceleration controller 46. Further parameters applied to the input 47 can be taken into consideration in the calculations in the deceleration controller 46. The parameters will be discussed in detail hereinbelow.

The output quantity of the deceleration controller 46, the nominal angular velocity for the electric motor, is initially sent to a rise limiter 48. Limiter 48 limits the variation of the nominal angular velocity of the motor to a maximum value or a minimum value (with a negative nominal motor acceleration).

The signal, that is possibly modified in this fashion, is sent to a servo booster 49 that, due to this signal, determines the intensity of the motor current and drives a corresponding final stage.

The electronic servo booster includes rotational speed control with a subordinated motor current control. For this purpose, the signal of the resolver 30 is sent to the servo booster 49.

Position control operates as follows. The signals of the resolver 30 are supplied to a position signal conditioner 50 that issues a value ni,t indicative of the position angle of the electric motor. The value is compared with a nominal angle $n_{soll}$ in a comparator 51, and the difference is sent to a position controller 52. Controller 52 determines from the difference a nominal angular velocity for the electric motor that is also sent to the servo booster 49 by way of the rise limiter 48.

One switch 55, 56 is provided in each of the two control circuits. The actuation of the switches 55, 56 is so that only the signal of a controller 46 or 52 is permitted to be passed through to the rise limiter 48 or the servo booster 49. This means, the system operates either with the deceleration controller 46 or with the position controller 52. The decision is taken by way of the selection and monitoring module 60 that performs the following tasks:

a) Selection of the active controller. The deceleration controller is active for S=1, the position controller is active for S=0.

b) Calculation and presetting of the nominal value for the motor position angle $n_{soll}$ when the position controller is active (S=0).

c) Updating of the deceleration controller parameters, for example, as a function of the rigidity.

d) Updating of the application force-travel characteristic curve or the brake torque-travel characteristic curve on the basis of the control circuit signals (mainly force or moment and position).

The selection is so configured that deceleration control principally overrules position control. The brake has a clearance in the non-actuated condition. When a nominal deceleration value $T_{soll}>0$ or $T_{soll}>g$ (and g is small) is predetermined, the deceleration controller is activated at once by S=1. Initially, the clearance is thereby overcome, and the nominal value required is subsequently adjusted. Release of the brake is signaled by a nominal deceleration value of $T_{soll} \neq 0$, or g. In this case, the position controller becomes active by setting S=0, and a reduced clearance is initially set in a position-controlled manner:

$$n_{soll} = n_o - n_{LS,Verm.}$$

$n_o$ represents the position where the linings, bear against the brake disc in a force-free manner. This reduced clearance is an 'initial setting' and shortens the reaction time in a repeated brake application shortly after the previous release of the brake, meaning that the brake may then be applied more quickly (This way of enhancing the readiness of operation is not possible in presently customary hydraulic auxiliary-force brake systems). In the absence of another desired deceleration signal $T_{soll}>0$ after lapse of a defined waiting time $t_1$, the full clearance is set in a position-controlled fashion:

$$n_{soll} = n_o - n_{LS,Verm.}$$

Upon lapse of a further waiting time $t_2$, in the absence of a preset nominal value $T_{soll}>0$ or g (request to apply the brake), the control is completed, and the controller electronics can be deactivated. Repeated activation is then effected again by $T_{soll}>0$ or g.

As mentioned hereinabove, the deceleration controller may operate on a different basis, depending on that value shall be adapted. As has already been explained, one possibility is to measure the application force and to define a corresponding standard for the application force as a nominal value.

Another possibility is to control the brake torque. The brake torque $M_B$ for a disc brake is linked to the application force $F_{sp}$ pursuant to the following relation $$M_B = 2 \cdot _{BS} \cdot r_B \cdot F_{sp}$$

UBS=friction value, $r_B$= effective friction radius. A corresponding relation applies to drum brakes.

The actual brake torque is measured either directly on the hub of the wheel or on the brake disc, or is determined from available data. When control is performed on the basis of the brake torque, the problem is that there is not always a signal that describes the brake torque. With the wheel unmoved (vehicle standstill or locked wheel), no brake torque signal appropriately associated with an application force can be determined in the plane. To prevent mechanical disturbances in the brake application, a change-over from brake torque adjustment to brake torque control must be performed in dependence on the wheel rotational speed and the signal scan time of the rotational speed generator when the speed remains under a specific threshold.

For this reason, the angular velocity of the wheel delivered at the differentiator 42 is sent to the selection and monitoring module 60. When the velocity falls short of a minimal value $n_{Rad,Min}$, the position controller is activated by setting the switch signal S=0. The nominal value for the position controller $n_{soll}$ is calculated from the conditioned nominal brake torque value in consideration of an updated brake torque-travel characteristic curve that is stored in the selection and monitoring module 60. This means that the displacement travel of the spindle, associated with the desired brake torque, is determined from the known or updated brake torque-travel characteristic curve and is converted into a corresponding angle of rotation of the electric motor 2.

A third possibility is to arrange for the deceleration controller 46 to operate on the basis of the time variation of the wheel angular velocity. The signal is produced by sending the output of the differentiator 42 to another differentiator 43 and by presetting a wheel rotational deceleration as a nominal signal.

Figure 3:
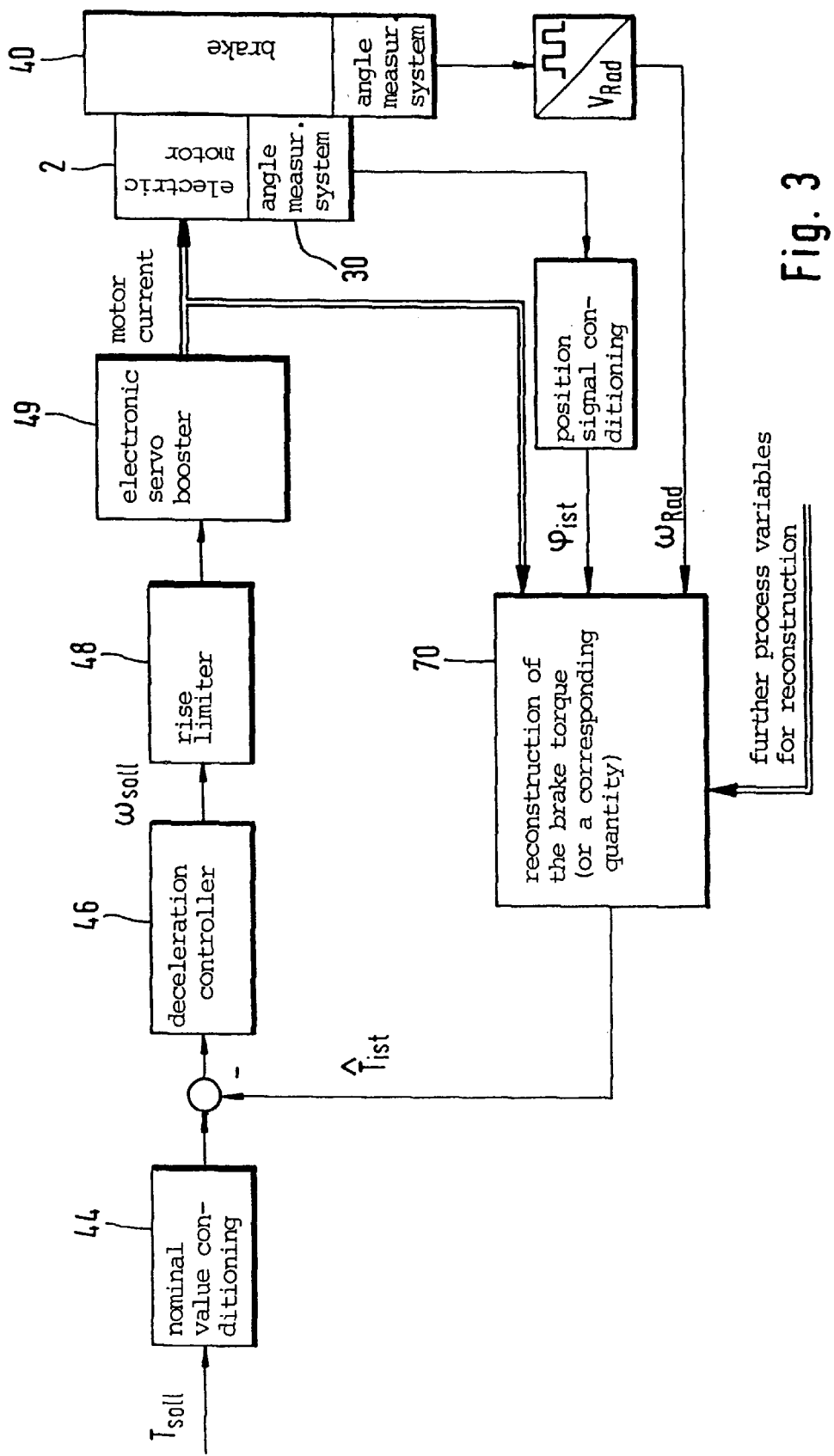
FIG. 3 shows the control circuit structure of FIG. 2 for the case when deceleration control is activated.

The brake torque or a quantity similar to the brake torque can also be determined by a reconstruction 70, as is shown in the FIG. 3 embodiment. FIG. 3 shows the control circuit structure of FIG. 2 for the case S=1 (deceleration control is activated). The motor current, the values of the resolver 30 on the electric motor 2, the values of a wheel rotational speed sensor and further process measurement signals, that are appropriate for the reconstruction and are (possibly) already provided as a standard in the vehicle, are taken into account for the reconstruction of a signal of this type.

We claim:

1. A control system for an automotive vehicle wheel brake operated by an electric motor, said system comprising:
   a first control circuit, said first control circuit comprising a position controller and a first switch,
   a second control circuit, said second control circuit comprising a deceleration controller and a second switch,
   a resolver furnishing position signals about a position angle of a rotor of said motor, said signals being characteristic of a distance between brake linings and brake disc in a brake,
   an angle measurement system allocated to a wheel associated with said brake,
   a desired value conditioner supplied with a nominal signal representing driver's desire to decelerate a vehicle to a certain degree, said desired value conditioner modifying said nominal signal,
   a position signal conditioner supplied with said position signals from said resolver,
   a first comparator to compare an output signal from said conditioner with a nominal angle value, an output signal from said first comparator being input to said position controller to provide a first control mode to calculate a nominal angular velocity for said motor,
   a second comparator to compare said modified nominal signal with an actual signal provided from said brake to indicate to what extent said driver's desire to decelerate is satisfied in said brake, an output signal from said second comparator being input to said decelerator controller providing a second control mode to calculate a nominal angular velocity of said motor, and
   a selection and monitoring module fed by said nominal signal and signals from said angle measurement system, said desire value conditioner, said position signal conditioner, and said actual signal, said selection and monitoring module generating said nominal angle value and furnishing control signals to said first and said second switches controlling same in such a way that only one of said deceleration controller and position controller is in an active mode at a given moment.

2. A system as claimed in claim 1,
   wherein the second control mode is activated when the brake shall be operated, to achieve a braking effect.

3. A system as claimed in claim 1,
   wherein the first control mode is activated in order to adjust a clearance between a friction surface coupled to a rotating wheel and a friction element that is displaceable by the electric motor.

4. A system as claimed in claim 3,
   wherein the clearance is adjusted to a small value proximate 0 for a brief interval after release of the brake and is adjusted to a normal value after lapse of this interval.

5. A system as claimed in claim 1, wherein an application force is chosen as the quantity that characterizes the braking effect.

6. A system as claimed in claim 1, wherein a brake torque produced by an application force is used as the quantity that characterizes the braking effect.

7. A system as claimed in claim 6, wherein a rotational wheel speed is determined, and the control is performed in the second control mode above a minimum speed and in the first control mode below said minimum speed.

8. A system as claimed in claim 1, wherein a vehicle deceleration is determined and chosen as the quantity that characterizes the braking effect.

9. The control system as claimed in claim 1, further comprising a differentiator connected between said angle measurement system and said selection and monitoring module.

10. The control system as claimed in claim 1, further comprising a rise limiter and a servo booster connected in series, an input of said rise limiter being fed from said first and said second switches, and an output of said booster being connected to said motor.

* * * * *